United States Patent [19]

Hattori et al.

[11] Patent Number: 4,527,214
[45] Date of Patent: Jul. 2, 1985

[54] POWER INVERTER WITH OVERLOAD PROTECTION APPARATUS

[75] Inventors: Motonobu Hattori, Funabashi; Akira Ishibashi, Tokyo; Hiromi Ishida, Chiba; Kenji Nandoh, Funabashi, all of Japan

[73] Assignee: Hitachi, Ltd., Tokyo, Japan

[21] Appl. No.: 481,150

[22] Filed: Apr. 1, 1983

[30] Foreign Application Priority Data

Apr. 2, 1982 [JP] Japan .................................. 57-53824

[51] Int. Cl.³ ........................ H02H 7/122; H02H 5/04
[52] U.S. Cl. ........................................ 361/96; 361/94; 361/24; 363/51
[58] Field of Search ................. 361/94, 96, 97, 30, 361/31, 24; 363/37, 51; 364/481, 483, 492

[56] References Cited

U.S. PATENT DOCUMENTS

| | | | |
|---|---|---|---|
| 3,526,809 | 9/1970 | Ogenhaus | 361/24 |
| 3,646,396 | 2/1972 | Fischer | 361/24 |
| 4,139,885 | 2/1979 | Overzet et al. | 363/37 X |
| 4,158,163 | 6/1979 | Eriksen et al. | 363/37 X |
| 4,240,149 | 12/1980 | Fletcher et al. | 364/483 |
| 4,291,355 | 9/1981 | Dinger | 361/96 X |

FOREIGN PATENT DOCUMENTS

| | | | |
|---|---|---|---|
| 47911 | 11/1979 | Japan | 361/96 |
| WO81/02496 | 9/1981 | PCT Int'l Appl. | 361/94 |
| 2047995 | 12/1980 | United Kingdom | 361/96 |

OTHER PUBLICATIONS

"Digital Programmable Time-Parameter Relay Offers Vers. and Acc.", IEEE Trans. on Power App. and Systems, vol. PAS-99, No. 1, Schweitzer, Jan./Feb. 1980.

*Primary Examiner*—Reinhard J. Eisenzopf
*Attorney, Agent, or Firm*—Antonelli, Terry & Wands

[57] ABSTRACT

A power inverter including a converter unit for rectifying AC power into DC power, an inverter for inverting the DC power into AC power for driving a load apparatus, and a protection apparatus for protecting the load apparatus from being overloaded. The load protecting apparatus comprises current detecting means for detecting a current supplied to the inverter unit from the converter unit, a memory for storing a thermally limited operation time characteristic determined in consideration of cooling effect proper to the load apparatus, and an abnormality detecting circuit for producing an abnormality signal to stop the operation of the inverter unit when an accumulated value calculated on the basis of the current value detected by the current detector at a predetermined sampling interval exceeds the characteristic value previously stored in the memory. The load apparatus can be positively protected from overload notwithstanding variations in the output voltage and the output frequency of the power inverter.

12 Claims, 6 Drawing Figures

POWER INVERTER WITH OVERLOAD PROTECTION APPARATUS

The present invention relates to a power inverter provided with an overload protection apparatus which is capable of protecting a load machine driven through the inverter from overload notwithstanding variations in voltage and frequency of the power supplied to the load.

As a circuit breaking system which responds to overcurrent or overload state of apparatus to be protected, there has heretofore been known a current detecting type circuit breaker (referred to as thermal relay) which is connected in a power supply line leading to the apparatus or machine constituting a load. A drawback of such current detecting type circuit breaker is seen in that the protection of the load apparatus can not be effected in a satisfactory manner when variations occur in the load operating conditions due to variations in parameters of the power supply source such as change in the frequency of the power supplied to the load, since the hitherto known current detecting type circuit breaker can operate only in response to the detection of a certain current level. For example, when a conventional electric motor provided with no external cooling equipment is operated through a power inverter, the self-cooling capability of the electric motor is extremely reduced to be overloaded, when the output frequency of the power inverter is decreased. In other words, in case operation of the electric motor is continued with the output frequency of the power inverter being decreased, the self-cooling capability of the electric motor is significantly degraded, incurring intolerable temperature rise even in a range of small load currents. Under the circumstance, the hitherto known current detecting type circuit breaker can not operate to protect the load apparatus from the overload because the load current does not attain the level to which the circuit breaker can respond. In brief, the conventional current detecting type circuit breaker is incapable of protecting a load apparatus from the overloaded state to a disadvantage when the cooling effect of the load apparatus is varied due to change in the frequency of the power supply (i.e. output frequency of the power inverter).

Accordingly, an object of the present invention is to provide a power inverter system provided with an overload protection apparatus which is capable of positively protecting a load apparatus from overload even when the cooling effect of the load apparatus undergoes changes as brought about by changes or variations in the output voltage or output frequency of the power inverter.

In view of the above and other objects which will become more apparent as description proceeds, there is proposed according to an aspect of the invention a power inverter system provided with an overload protection apparatus which comprises current detecting means for detecting a current supplied to a load apparatus to be protected, memory means for storing therein a thermally limited operation time characteristic of the load apparatus in which the cooling effect proper to the load apparatus is considered, and abnormality detecting means for producing an abnormality signal when an accumulated value determined on the basis of the detected values of the current detected by the current detecting means exceeds a predetermined value stored previously in the memory means, wherein the abnormality signal is utilized for triggering measures for protecting the load apparatus from being overloaded.

The present invention will be more apparent from the following detailed description taken in conjunction with the accompanying drawings, in which.

Now, the invention will be described in conjunction with a preferred embodiment thereof by referring to the accompanying drawings. In the case of the illustrated embodiment, a value corresponding to a primary current supplied to a load apparatus to be protected from being overloaded is arithmetically determined with the aid of an arithmetic operation unit incorporated in a power inverter on the basis of an average DC current flowing through a DC circuit provided internally in the power inverter system, wherein an accumulated value of the primary current thus determined is compared with the thermally limited operation time characteristic value stored previously in a memory. Temperature rise in the load apparatus due to overload or overcurrent is thus predicted to break the output power of the inverter, to thereby assure the protection of the load apparatus.

Figure 1:
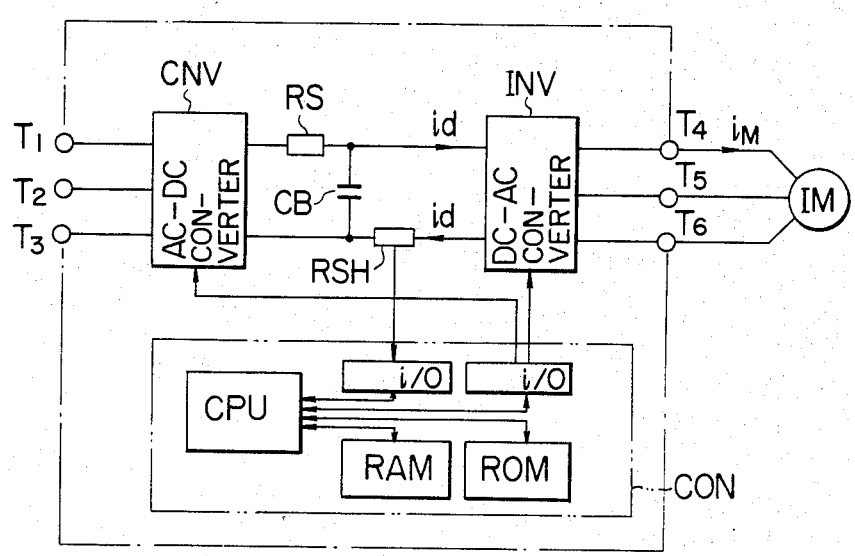
FIG. 1 is a block diagram showing a general arrangement of a power inverter incorporating an overload protection apparatus according to an embodiment of the invention.

Referring to FIG. 1 which illustrates in a block diagram a general arrangement of a power inverter system incorporating an overload protection apparatus according to an embodiment of the present invention, $T_1$, $T_2$ and $T_3$ denote input terminals for a three-phase AC power, CNV denotes a converter unit for converting or rectifying the three-phase AC power into a DC power, and INV denotes an inverter unit for converting or inverting the DC power again into a three-phase AC power. The converter unit CNV and the inverter unit INV are, respectively, constituted by combinations of transistors or thyristors in a manner known per se. Reference letters RS and CB designate a current limiting resistor and a smoothing capacitor, respectively, which are inserted in a DC circuit for connecting the converter unit CNV and the inverter unit INV to each other. Reference letters can denote an inverter control circuit for primarily controlling a base circuit of the transistors or a gate circuit of the thyristors constituting the converter unit CNV and/or the inverter unit INV, respectively. The inverter control circuit includes a read-only memory ROM for storing control procedures and various data required for the control of the inverter unit, a temporary memory RAM (random access memory) for storing various interim or transient data also required for the aimed controls. Interfaces i/o serve to convert various analogue quantities into digital quantities or vice versa. A central processing unit CPU serves as an arithmetic operation unit for the power inverter system for executing various arithmetic operations in accordance with programs stored previously in the memory ROM, the resulting signals being utilized for controlling the base circuit of the transistors or the gate circuit of the thyristors constituting the inverter unit INV by way of the interface i/o. The output power of the inverter unit INV is coupled to a three-phase induction motor IM (load apparatus) through output terminals T4, T5 and T6.

With the arrangement of the power inverter described above, it is common in practice that upon starting of operation of the power inverter, the output frequency and the output voltage of the inverter with INV is controlled in accordance with a predetermined program for starting the three-phase induction motor. Further, when a speed command signal is inputted through the interface i/o from a speed setting unit (not shown), the arithmetic operation unit CPU of the power inverter produces through arithmetic operation the base or gate control signals required for realizing the operating condition commanded by the speed setting unit, wherein the base or gate control signals are supplied to the inverter unit INV through the interface i/o to cause the three-phase induction motor IM to be operated at the commanded speed.

A current detecting resistor RSH is inserted in the DC circuit interconnecting the converter unit CNV and the inverter unit INV and serves for detecting the amount of DC current consumed by the inverter unit INV. A voltage drop produced across the current detecting resistor RSH and having magnitude proportional to the DC current consumption of the inverter unit INV is supplied to the inverter control circuit CON through the interface i/o. It should further be mentioned that the memory ROM also stores previously various calculation programs for protecting the load apparatus (i.e. the three-phase induction motor in the illustrated case) and thermally limited operation time characteristics in which the cooling effect inherent or proper to the load apparatus is considered.

Figure 2:
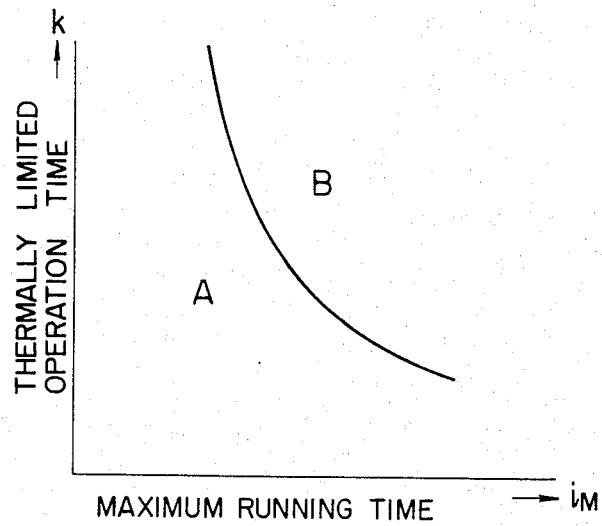
FIG. 2 is a view for graphically illustrating a thermal characteristic of an induction motor, by way of example.

Now, the basic principle of operation for protecting the load from being overloaded (simply referred to as the overload protection) will be described in the power inverter system of the arrangement described above. FIG. 2 graphically illustrates, by way of example, a thermal characteristic of an induction motor driven, being supplied from a commercial power supply line. In this figure, magnitude $i_M$ of the primary current flowing into the induction motor is taken along the abscissa, while a function k of a time permitting a continuous operation (thermally permissible time limit) is taken along the ordinate. In a region A, safety operation of the induction motor can be assured. On the other hand, the induction motor is under overload and requires protection in the region B. In general, increase in the temperature of the induction motor is in proportion to a product of square of the primary current $i_M$, the aforementioned time function k and a cooling coefficient representative of the cooling effect of the motor. When the primary current of the induction motor is represented by $i_M$ with the time or duration of the motor operation being represented by t, while the temperature increment is by $\Delta T$, the latter is given by the following expression:

$$\Delta T = \int_0^t K_o \cdot i_M^2 \cdot dt$$

where $K_o$ represents a proportional constant which differs in dependence of structures of the induction motors and includes the cooling coefficient. The proportional constant $K_o$ is also a function of the operating speed (number of revolution) of the motor. On the other hand, in the case of the PWM (Pulse Width Modulation) power inverter, the primary current $i_M$ flowing in the induction motor is related to a DC current id flowing through the DC circuit interconnecting the converter unit CNV and the inverter unit INV by the following expression:

$$i_M = K_1 \times K_2 \times \frac{af_{max} + b}{af + b} id \qquad (2)$$

where
f: output frequency of the power inverter,
$f_{max}$: maximum frequency in a constant torque region,
$K_1$: ratio between DC voltage of the DC circuit and the primary voltage (rms value) of the induction motor at the frequency $f_{max}$,
a, b: constants,
$K_2$:

$$\frac{\mu}{\sqrt{3} \cos \theta}$$

$\mu$: efficiency of inversion, and
$\cos \theta$: power factor of the primary side of the induction motor.

The primary current $i_M$ of the induction motor can be calculated in accordance with the expression (2) on the basis of the DC current id detected through sampling at a predetermined time interval with the aid of the current detecting resistor RSH. The value of the primary current $i_M$ is powered by an exponent n derived from the thermally limited operation time characteristic curve of the induction motor illustrated in FIG. 2 and multiplied by a function $\alpha$ of the cooling coefficient graphically illustrated in FIG. 3 and a sampling time (detection time) $\Delta t$ to determine an accumulated value $I_i$ which is thus given by the following expression:

$$\text{Instant } I_i = i_M^n \times \alpha \times \Delta t + \text{Preceding } I_i \qquad (3)$$

Figure 3:
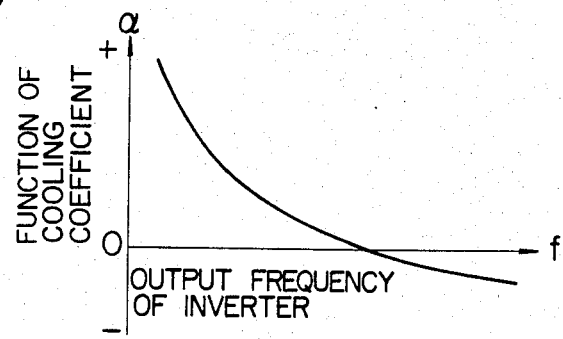
FIG. 3 is a view for graphically illustrating a relationship between the output frequency of a power inverter system along the abscissa and the function $\alpha$ of a cooling coefficient along the ordinate.

The accumulated current value $I_i$ is obtained at every sampling time $\Delta t$. In FIG. 3, the output frequency of the power inverter system (the number of revolution of the induction motor) is taken along the abscissa, while the function $\alpha$ of the cooling coefficient is taken along the ordinate.

As will be seen from FIG. 3, the function $\alpha$ of the cooling coefficient may assume positive (plus), nearly zero, or negative (minus) value in dependence of the operating speed of the induction motor. When the accumulated value $I_i$ exceeds the maximum running time curve of the induction motor shown in FIG. 2, it may then be decided that the temperature of the induction motor has increased beyond the permissible limit and thus the motor is in the overloaded state. At that time, operation of the power inverter system has to be stopped for the protection of the induction motor.

Figure 4:
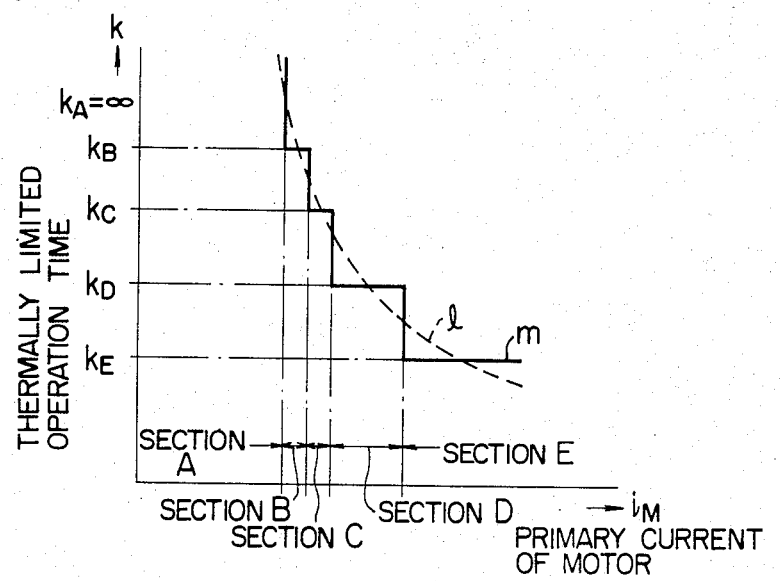
FIG. 4 is a view for graphically illustrating a processing of a thermally limited operation time characteristic through approximation.
Figure 5:
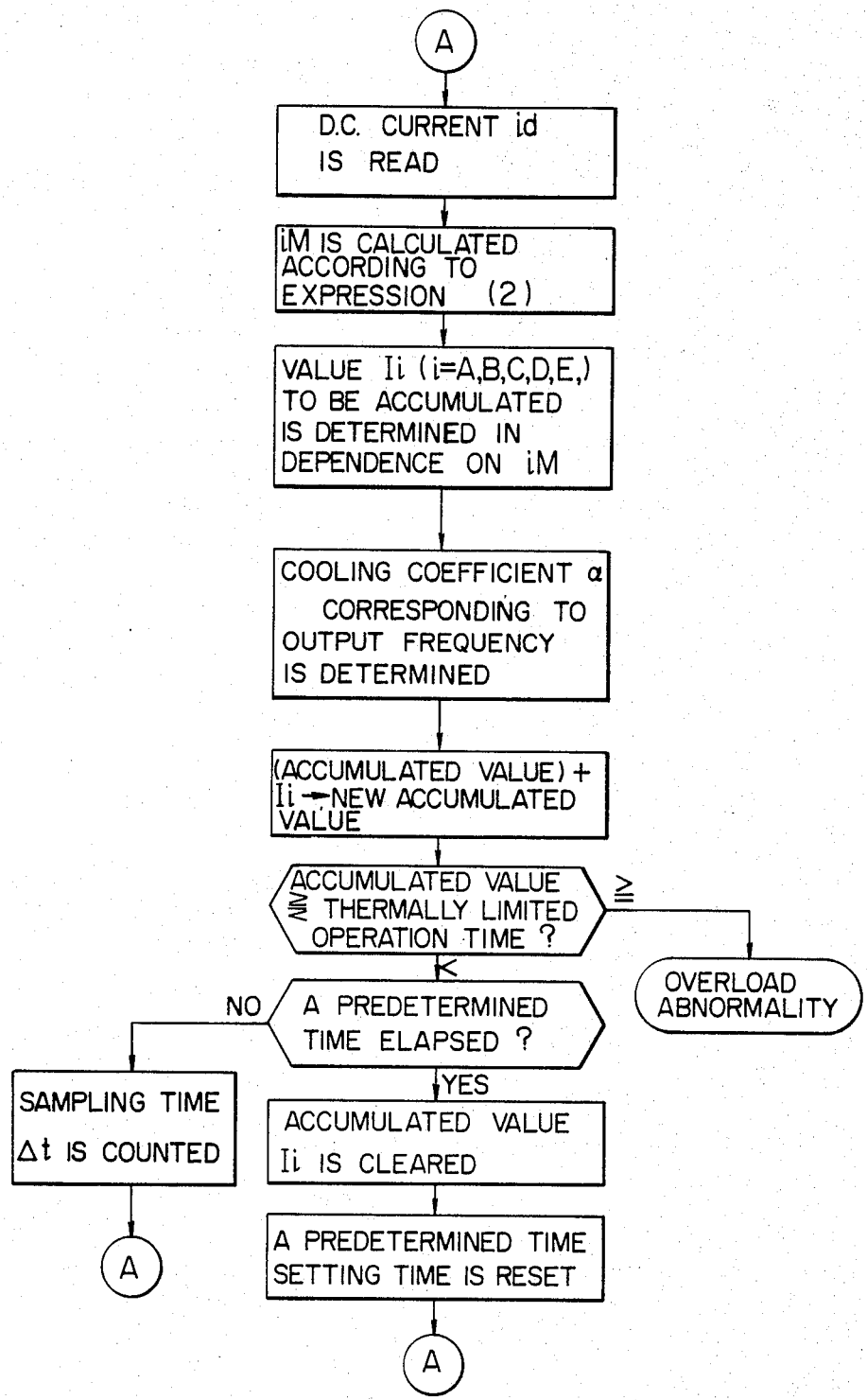
FIG. 5 shows a flow chart for illustrating processing executed for protecting a load apparatus driven by the power inverter from overload.

Practically, the arithmetic determinations or calculations in accordance with the expressions (2) and (3) are carried out by the arithmetic operation unit CPU incorporated in the inverter control circuit of the power inverter system shown in FIG. 1. An example of such arithmetic determination will be elucidated by referring to FIGS. 1, 4 and 5. FIG. 4 illustrates graphically an approximation process for processing the thermally limited operation time characteristic curve l, according to which the primary current $i_M$ is divided into a plurality of sections A, B, C, D and E with which thermal time limits $k_A$, $k_B$, $k_C$, $k_D$ and $k_E$ are correspondingly combined, respectively. Values m resulting from the stepwise approximation of the thermal time limitation curve are stored previously in the memory ROM in the form of a numerical table listing the primary currents $i_M$ and the functions k of the thermally limited operation time. Further, relations between the functions $\alpha$ of the cooling coefficients and the operating speeds N (output frequencies f of the power inverter) also are previously stored in the memory ROM in the form of a numerical table. FIG. 5 shows a flow chart for illustrating a processing for protection against the overload. The contents of this processing flow are also stored in the memory ROM in the form of a processing program. Additionally, storage areas for storing the accumulated value $I_i$ for every sections A, B, C, ..., E are reserved in the temporary memory RAM.

Referring to FIG. 5, the arithmetic operation unit CPU incorporated in the inverter control circuit CON fetches the relevant program from the memory ROM and samples the voltage drop across the current detecting resistor RSH (value of the DC current id) through an interface i/o, as is shown in FIG. 5, to calculate the primary current $i_M$ in accordance with the expression (2) on the basis of the sampled DC current value. The arithmetic operation unit CPU then determines the one of the primary current sections previously stored in the memory ROM to which the calculated primary current $i_M$ does correspond. Subsequently, in accordance with the current output frequency and the command value of the inverter system (the latter is actually the data stored in the temporary memory RAM managing the output frequency of the inverter system), the corresponding data of the function $\alpha$ of the cooling coefficient is read out from the memory ROM, whereupon the arithmetic operation is performed in accordance with the expression (3), the resulting value $I_i$ being stored in the storage area of the temporal memory which corresponds to the section of the primary current determined in precedence. Next, the arithmetic operation unit CPU reads out the function k of the thermally limited operation time corresponding to the previously determined primary current section from the associated table previously stored in the memory ROM and compares the read-out function k with the obtained value $I_i$. When the value $I_i$ is equal to the function k of the thermally limited operation time or exceeds the latter, an abnormality signal is issued to indicate the overload abnormality. When the overload abnormality is thus decided by the arithmetic operation unit CPU, the supply of the base control signal or the gate control signal to the inverter unit INV or the converter unit CNV through the interface i/o is interrupted to stop the operation of the inverter unit INV or the converter unit CNV. When the above mentioned comparison results in that the value $I_i$ is still short of the function k of the thermally limited operation time, it is determined by the arithmetic operation unit CPU whether a predetermined safety time provided in view of safety has elapsed or not. Unless the safety time has elapsed, the sampling time $\Delta t$ is counted up, which is followed by the reading of the DC current id and the processing described above. When the accumulating processing in accordance with the expression (3) is repeated, there will arise an accumulated error, involving difference with respect to the actual function k of the thermally limited operation time. Accordingly, when decision of the overload abnormality is not issued for a predetermined period, the individual accumulated values $I_i$ stored in the storage areas reserved in the temporary memory RAM in correspondence with the sections of the primary current are cleared or reset to zero. In succession to the clearing of the storage areas of the temporary memory RAM, a timer for measuring a predetermined time duration is also cleared to zero. After the processing for initialization has been effected in this way, the arithmetic operation unit CPU again fetches the DC current id, which is followed by the operations described above. In this manner, the load apparatus can be protected from being overloaded through the various processings executed by making use of the control circuit of the power inverter system without any need for providing an external processing apparatus to this end.

In the case of the embodiment described above, the storage areas for storing, respectively, the accumulated values $I_i$ determined for every section of the primary current $i_M$ divided into a plurality of the sections are reserved in the temporary memory RAM. However, the similar effect can be attained also by providing in the temporary memory RAM a storage area for storing data representative of percentage of the accumulated value $I_i$ relative to the thermally limited operation time t. More specifically, in the course of performing the arithmetic operation in accordance with the expression (3), the percentage of the function k of the thermally limited operation time is determined to which the value $i_M{}^n \times \alpha \times \Delta t$ corresponds at the sections A, B, ..., E of the primary current $i_M$, wherein the calculated values are accumulated. When the accumulated value has attained 100% of the function k of the thermally limited operation time, protection is taken for the load apparatus against the overload. In particular, the arithmetic operation unit CPU samples the DC current id and calculates the primary current $i_M$ in accordance with the expression (2). The function k of the thermally limited operation time corresponding to the section to which the calculated value of the primary current $i_M$ belongs is read out from the numerical table stored in the memory ROM and containing combinations of the primary current $i_M$ and the functions k, whereupon arithmetic operation is executed by the CPU in accordance with the following expression:

$$J = \frac{i_M{}^n \times \alpha \times \Delta t}{t} \times 100 \; (\%) \quad (4)$$

For the function k of the thermally limited operation time, the value $k_A$, $k_B$, ... or $k_E$ corresponding to the calculated primary current $i_M$ is used. The relative value J (%) of the thermally limited operation time determined in accordance with the expression (4) is subsequently added to the accumulated relative value J(%) stored in the memory area of the temporary memory RAM, to be subsequently stored in the same storage area. When the accumulated value reaches 100% of the function k, this fact is recognized by the arithmetic operation unit CPU, whereby the processing for the overload protection is executed to protect the load apparatus from the overload.

In the case of the embodiment described above in which the absolute or relative values of the thermally limited operation time are successively accumulated, it is possible to predict the temperature condition of the load apparatus and take the protection measures for the load apparatus on the basis of the result of the prediction. In the foregoing description of the embodiments of the present invention, it has been assumed that the thermally limited operation time characteristic which is determined in consideration of the cooling effect proper to the load apparatus to be protected from being overloaded is previously stored in the memory ROM in the form of a numerical table containing combinations of data for the primary currents $i_M$ and the functions k of the thermally limited operation time. However, it is possible to store previously a numerical table of more general type of thermally limited operation time characteristics in which no consideration is made as to the cooling effect and a numerical table listing the coefficients of cooling corresponding to an operation parameter of the load (e.g. the number of revolution in the case of an electric motor) separately in the memory ROM and perform the protection of the load apparatus form overload by referring to both the numerical tables. Further, in place of preparation of the numerical table or tables, the thermally limited operation time characteristic may be stored in the form of a numerical function, whereby the protection against overload is effected on the basis of the stored numerical function. In the foregoing description, it has also been assumed that the overload protection apparatus is incorporated in the power inverter system. It goes however without saying that the overload protection apparatus can be implemented as a separate unit within the scope of the invention. In this case, there are provided a relay circuit for interrupting the output power of the inverter system and driving means for driving the relay circuit. Besides, the detection of the load current can be effected by a current transformer in place of the detecting resistor. Although the abnormality detection has been described as being realized with the aid of the digital circuits, this function can of course be accomplished by using analogue circuits as well.

Figure 6:
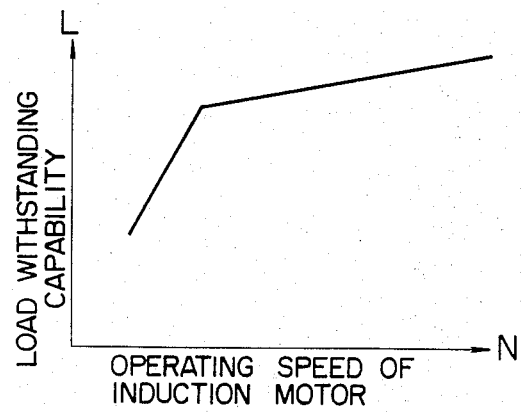
FIG. 6 is a view for graphically illustrating a relationship between load withstanding capability L operating speed N of an induction motor.

In general when the rotating speed of the motor is lowered, the cooling efficiency of the motor is also lowered. In this case, as shown in FIG. 6, the load torque L should be reduced in the low speed area.

As will be appreciated from the foregoing description, there has been provided according to the invention a power inverter system which is provided with an overload protection apparatus including current detecting means for detecting a current supplied to a load apparatus, memory means for storing the thermally limited operation time characteristic in which cooling effect proper to the load apparatus is considered, and abnormality detecting means for producing an abnormality signal which commands the protection of the load apparatus against overload, when an accumulated value of calculations effected on the basis of the outputs of current detecting means for determining or predicting temperature state of the load apparatus exceeds a predetermined value stored in the memory means. Accordingly, in the power inverter system according to the present invention, the load apparatus such as electric motor can be positively protected from the overload by virtue of the reliable overload detection notwithstanding variations in the conditions or parameters of the power supply source (i.e. inverter output) and the cooling effect of the load apparatus.

What is claimed is:

1. A power inverter including a converter unit for converting AC power into DC power, an inverter unit for converting the DC power into AC power, and an overload protection apparatus which comprises current detecting means for detecting a current supplied to an electric motor connected to said power inverter; memory means for storing therein thermally limited operation time characteristic values which are previously determined in consideration of a cooling effect for said electric motor which changes in accordance with the operation speed of said electric motor connected to said power inverter; and abnormality detecting means for producing an abnormality signal to stop operation of said inverter unit or said converter unit when an accumulated value arithmetically determined on the basis of values of the current detected by said current detecting means periodically at a predetermined interval exceeds a corresponding one of said values stored in said memory means.

2. A power inverter according to claim 1, wherein a plurality of detection ranges are provided in dependence on the value detected by said current detecting means, said accumulated value being arithmetically determined in each of said detection ranges, said abnormality signal being issued when any one of said accumulated values determined in said plural detection ranges exceeds corresponding one of said values stored in said memory means.

3. A power inverter according to claim 1, wherein said current detecting means includes a current detecting resistor inserted between said converter unit and said inverter unit, said current detecting means being adapted to detect a voltage drop produced across said current detecting resistor.

4. A power inverter according to claim 1, wherein said abnormality detecting means is so arranged that said accumulated value arithmetically determined on the basis of the current value detected by said current detecting means periodically at the predetermined time interval is reset to zero at every predetermined time interval.

5. A power inverter according to claim 1, wherein said memory means stores the thermally limited operation time characteristic which is so determined that the time for which said electric motor is allowed to be operated continuously is increased as the detected supplied current value becomes smaller and the operation speed of said electric motor becomes greater.

6. A power inverter according to claim 1, wherein said memory means stores a numerical function representative of said thermally limited operation time characteristic.

7. A power inverter including a converter unit for converting AC power into DC power, an inverter unit for converting the DC power and supplying AC power of variable frequency to an electric motor operable at variable speeds in accordance therewith, and an overload protection apparatus which comprises current detecting means for detecting a current supplied to said electric motor which is connected to said power inverter, memory means for storing therein thermally limited operation time characteristic values of the current value detected by said current detecting means and the function of a cooling coefficient corresponding to the operation speed of said electric motor, and abnormality detecting means for producing an abnormality signal to stop operation of said inverter unit or said converter unit when an accumulated value arithmetically determined on the basis of values of the supplied current periodically detected at a predetermined interval by said current detecting means, the operation speed of said electric motor, and the function of the cooling coefficient corresponding to the operation speed of said electric motor exceeds a corresponding one of the values stored in said memory means.

8. A power inverter according to claim 7, wherein said memory means is provided with a numerical table in which the thermally limited operation time characteristic values extend the continuous operable time of said electric motor in accordance with a reduction of the detected supplied current value, and another numerical table in which the function of the cooling coefficient is such that the cooling effect is reduced with a reduction of the operation speed of said electric motor.

9. A power inverter according to claim 8, wherein a plurality of detection ranges are provided in dependence on the value detected by said current detecting means, said accumulated value being arithmetically determined in each of said detection ranges, said abnormality signal being issued when any one of said accumulated values determined in said plurality of detection ranges exceeds a corresponding one of said values stored in said numerical table of the thermally limited operation time characteristic values for stopping the operation of the power inverter.

10. A power inverter including a converter unit for converting AC power into DC power, an inverter unit for converting the DC power and supplying AC power of variable voltage and variable frequency to an electric motor operable at variable speeds in accordance therewith, and an overload protection apparatus which comprises current detecting means for detecting the current supplied to said electric motor which is connected to said power inverter by a voltage drop produced across a current detecting resistor inserted in a DC power supply circuit for connecting said converter unit with said inverter unit in said power inverter, memory means for storing therein a numerical table of thermally limited operation time characteristic values in which values corresponding to a continuous operable time of said electric motor in accordance with the current value detected by said current detecting means is selected to be increased in stages in accordance with a reduction of the current value for every stage of detected current value, and another numerical table of the function of a cooling coefficient for said electric motor in which the function of the cooling coefficient becomes smaller in accordance with a reduction in the operation speed of said electric motor, temporary memory means for storing command values for the output frequency of the inverter unit of said power inverter, and abnormality detecting means for producing an abnormality signal to stop operation of said inverter unit or said converter unit when an accumulated value arithmetically determined on the basis of values of the current periodically detected at a predetermined interval by said current detecting means, the operation speed of said electric motor in accordance with the stored values of said temporary memory means, and the value of the cooling coefficient of said electric motor corresponding to the operation speed of said electric motor, the values being classified for every current value stage set by said numerical table of said memory means in accordance with the current value and being integrated, said abnormality signal being issued when any of the integrated values exceed a corresponding one of the current value of said numerical table of the thermally limited operation time characteristic values stored in said memory means.

11. A power inverter according to claim 10, wherein said abnormality detecting means includes a temporary memory device for successively integrating the values in accordance with the stage of each current value of said numerical table of the thermally limited operation time characteristic values stored in said memory means and for temporarily storing the integrated values.

12. A power inverter according to claim 11, wherein said abnormality detecting means includes means for resetting the stored contents of the temporary memory device to zero at a predetermined time interval.

* * * * *